United States Patent Office 2,994,310
Patented Aug. 1, 1961

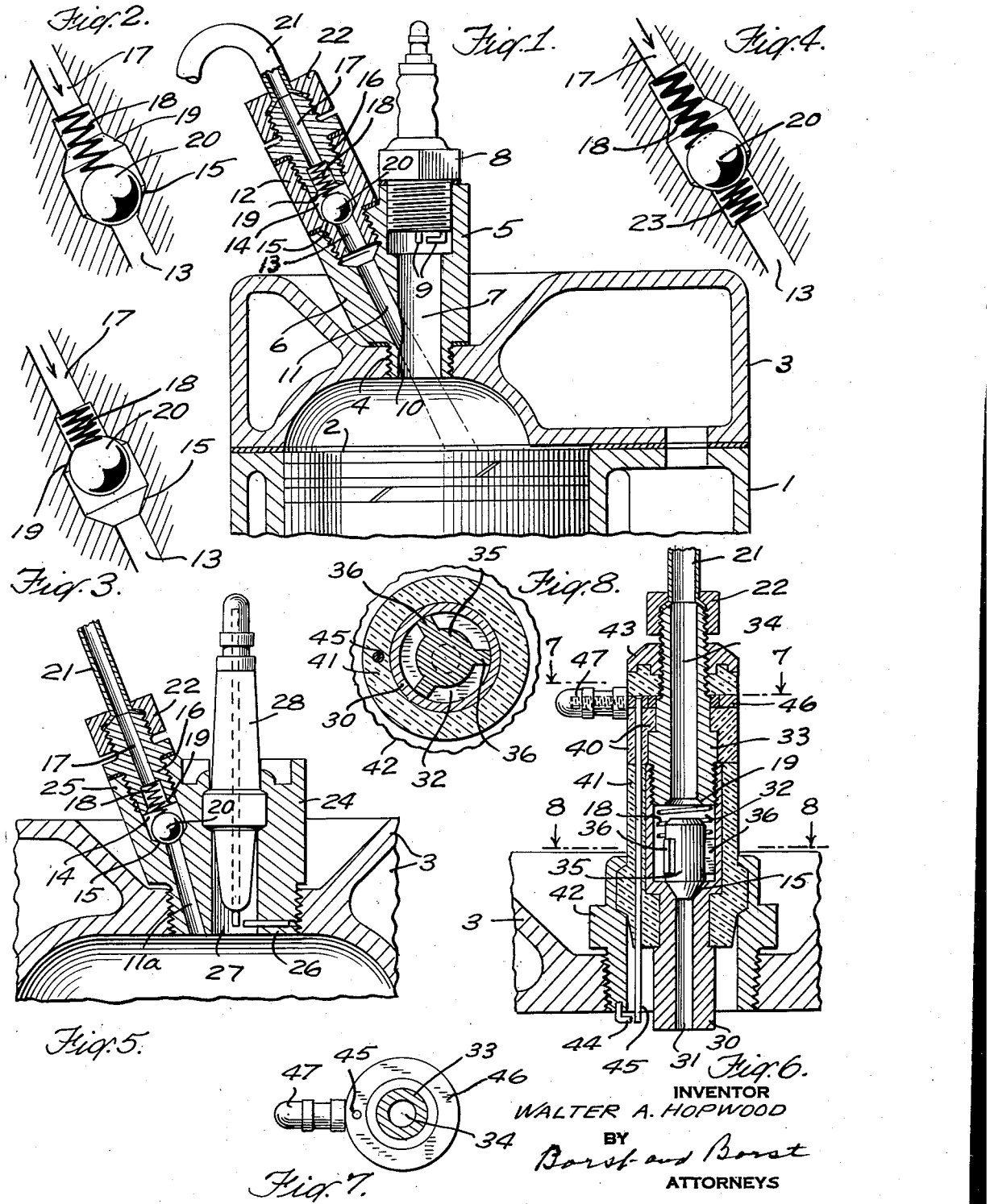

2,994,310
MEANS FOR INTRODUCING AUXILIARY AIR INTO INTERNAL COMBUSTION ENGINE
Walter A. Hopwood, 916 Lincoln Place, Teaneck, N.J.
Filed May 27, 1959, Ser. No. 816,126
8 Claims. (Cl. 123—26)

This invention relates to internal combustion engines and particularly to means for increasing the horsepower output of an engine for a given fuel consumption.

More specifically, it is a purpose of the invention to improve the combustion of the compressed mixture in the cylinders, that is, to burn more of the carbon monoxide into the dioxide than has heretofore been attainable.

In accordance with the invention this is accomplished by supplying additional air to the mixture during the period of flame propagation. Specifically this is accomplished by introducing air under substantially constant pressure to the cylinder through a control valve that is responsive to the relative pressures to exclude the auxiliary air when the cylinder pressure exceeds the air pressure and to open to the cylinder when the cylinder pressure is less than the air pressure and the differential in pressure is less than a predetermined amount, and to shut off communication with the cylinder when the differential exceeds the predetermined amount.

Thus the air under pressure is forced into the cylinder under automatic control of the relative pressures for a brief instant in the early part of the combustion stroke and instantaneously checks the drop in cylinder pressure as the piston recedes, and the blast of air introduced during that instant provides the oxygen needed for added combustion beyond that afforded by the oxygen in the original mixture. The drop in cylinder pressure is nevertheless so rapid in the cylinder on the combustion stroke that the air pressure comes to predominate very quickly and shuts off the control valve and prevents further introduction of air. The valve remains closed during the scavenging and suction strokes and during the compression stroke of a four cycle engine until the engine pressure sufficiently exceeds the air pressure and the valve is again reset to shut off the burnt gases from the air supply when combustion occurs.

The valve is a double acting check valve operating between two opposing seats and is caused to close admission of air into the cylinder when the air pressure sufficiently predominates and to close backward movement of gases into the air supply when the cylinder pressure predominates. It is possible to modify the time and speed of movement of the valve between the seats by the use of springs on one or both sides of the valve and the invention contemplates the use of such springs.

The invention also contemplates a valve construction which will permit use of the conventional spark plug opening in the cylinder head. For this purpose it is proposed to use an adapter which includes the valve and valve body and has provision at one end to screw into the spark plug opening and at the other end to receive a spark plug in hermetically closed contact and with the electrodes or points in communication with the cylinder.

The invention also contemplates combination valve and spark plug constructions and various special features of construction as will appear from the following description of the embodiments of the invention illustrated in the accompanying drawings.

FIG. 1 is a section of the top of a cylinder and the cylinder head including an embodiment of one form of the invention.

FIG. 2 is an enlarged sectional view of the valve structure with the valve on one of the opposing seats.

FIG. 3 is a view similar to FIG. 2 showing the valve on the other seat.

FIG. 4 is a view similar to FIG. 2 but with the addition of a second spring.

FIG. 5 is a view similar to FIG. 1 showing a modified embodiment of the invention.

FIG. 6 is a view similar to FIG. 5 showing still another modified form of the invention.

FIG. 7 is a section on line 7—7 of FIG. 6.

FIG. 8 is a section on an enlarged scale on line 8—8 of FIG. 6.

The construction of FIG. 1 is of the adapter type in that it utilizes the conventional spark plug opening. The fuel inlet and exhaust valves are conventional and are not shown. The cylinder 1 has a piston 2 reciprocating therein and has a conventional head 3 including a water jacket. The screw threaded opening 4 is the conventional spark plug opening.

Screwed into this opening 4 is a combined valve body and adapter shown as a composite structure. The adapter 5 is a tubular metallic, generally cylindrical body having a lateral extension 6 for receiving the valve body. The hollow interior 7 constitutes a cylindrical chamber extending from end to end of the adapter, the upper end being enlarged and internally screw threaded to receive the spark plug 8 with its points 9 in the chamber. The lower end of the adapter has a screw threaded extension 10 which screws into the spark plug opening 4.

As shown, the air inlet valve is associated with the adapter at an acute angle so that the air enters the chamber 7 near the lower end thereof and remote from the points 9. This is to avoid contact of the air with the points which would cause the points to become overheated with resultant pre-ignition.

The lateral extension 6 has a central bore 11 which enters the chamber 7 at the acute angle. The upper end of bore 11 is enlarged and internally screw threaded, and the reduced end of a valve body 12 screws into this threaded bore. The valve body is axially hollow, having in its reduced end a bore of passage 13 which leads into a larger valve chamber 14 in the main valve body with a valve seat 15 at the juncture of the bore 13 and chamber 14.

The upper end of the chamber 14 is internally screw threaded and receives a threaded plug 16 which has an axial bore or passage 17 which is enlarged at its lower end to receive a spring 18 and terminates at its lower end in a valve seat 19 opposing the valve seat 15. In the chamber 14 between the valve seats is a valve in the form of a ball 20. The diameter of the ball is somewhat less than that of the chamber 14 and is adapted to seat on either seat. The spring 18 bears against the ball and biases it toward seat 15.

Provision is made to deliver air under constant pressure through a conduit 21 which connects with bore 17, being attached to the outer end of plug 16 by a coupling nut 22 that screws on to a threaded outward extension on the plug 16.

The operation of the valve is illustrated in FIGS. 2 and 3. Air at a predetermined pressure, say 200 pounds per square inch, is applied in conduit 21. To this is added the force of spring 18 and the pressure thus exerted on the ball 20 is balanced against the cylinder pressure which is communicated to the ball through passage 13. Whichever pressure sufficiently predominates will determine the position of the valve. FIG. 2 shows the position when the air pressure predominates, and FIG. 3 shows the position when the cylinder pressure predominates.

Following the seating of the ball on seat 15 as the piston recedes on the combustion stroke the ball will remain on that seat throughout the other three strokes and until the ignition of the compressed charge produces a rapid rise in the cylinder pressure which is communicated to the ball and lifts it off seat 15 and forcibly impels it across chamber 14 and on to seat 19, compressing spring 18.

By this time, the piston connecting rod is over center and the piston starts to recede and the pressure falls. As the cylinder pressure falls to near that of the air, the spring 18 begins to take over and the ball is lifted from its seat and moves across to the opposite seat as shown in FIG. 2.

This movement of the valve across chamber 14 from the position of FIG. 3 to that of FIG. 2 is not nearly as rapid as is its movement in the opposite direction, and during that appreciable period, when the valve is off both seats a blast of air passes around the valve and enters the cylinder through passages 13 and 11. This auxiliary air, being under pressure, tends to decrease the rate of pressure drop in the cylinder and thus to retard somewhat the seating of the valve on seat 15, thus prolonging the cut-off of the air. If desired, the cut-off may be further prolonged by the use of a spring 23 acting in opposition to spring 18 and being preferably weaker than spring 18, as shown in FIG. 4.

This auxiliary air adds further oxygen to the combustible mixture and produces more complete combustion, resulting in greater power output from the fuel consumed, higher temperature of the exhaust gases, a larger percentage of $CO_2$ and higher r.p.m. for a given throttle setting.

FIG. 5 shows a modified type of adapter construction in which the spark plug points are brought closer to the combustion chamber and the air inlet of the valve delivers directly into the combustion chamber instead of into the chamber containing the points. In this construction, a larger opening in the head is required and the conventional spark plug opening cannot be used. Incidentally a special spark plug construction is shown although the adapter may be designed for a standard spark plug.

As shown, the adapter 24 is also a metallic, generally cylindrical member with a lateral projection 25 and has a threaded extension 26 that screws into an opening provided for this purpose in the head 3. The cylindrical adapter is tubular, having a bore 27 into which is secured a spark plug 28, the grounded point being in the adapter near the inner end of the bore 27 and in proximity to the cooperating point in the lower end of the spark plug.

The lateral extension 25 constitutes the body portion of the air valve construction and contains the passage 11a which corresponds to passage 11 of FIG. 1 but which leads directly into the combustion chamber at one side of bore 27. Thus the points may be brought very close to the combustion chamber.

The passage 11a communicates with the valve chamber 14 for the valve 20 in the valve body with the valve seat 15 at their juncture. The plug 16 screws into the screw threaded outward extension of the valve chamber and provides the valve seat 19 and the seat for spring 18 as in FIG. 1. The conduit 21 for the air is connected to the plug 16 by nut 22, also as in FIG. 1.

FIG. 6 shows a further modified construction in which the spark plug points are in the combustion chamber, and in which the valve and spark plug are coaxial in a generally cylindrical, composite construction with the spark plug external of the valve body. Also in this construction an alternative type of valve is employed.

A tubular valve body is composed of a bottom seat section 30 with an axial bore 31 leading into an enlarged valve chamber 32 with the bottom valve seat 15 at the juncture of the bore 31 and chamber 32. A valve plug 33 screws into the top end of chamber 32 and has the upper valve seat 19 on its bottom end at the juncture of the axial passage 34 and the valve chamber 32. A spring 18 bears on top of the valve 35 which in this case is a cylindrical member shaped on each end to cooperate with the appropriate valve seat and having a pressure area on each end, the two pressure areas being of differential size. As shown, the upper area is larger than the lower.

The cylindrical valve 35 is of lesser diameter than the chamber 32 and is guided by radial ribs 36. The spring 18 is shown as bearing on the ribs. As in the previous constructions, the air conduit 21 is connected to the plug 34 by nut 22.

The surrounding spark plug includes an insulating shell surrounding the valve body having two parts 40 and 41, with a metallic screw threaded collar 42 at its lower end which screws into an opening in the head 3. The spark plug and valve body are coupled by a screw cap 43 on the plug 33. The grounded point 44 for the screw plug is secured in the collar 42 and is in the combustion chamber, the cooperative point 45 extending down through sections 40 and 41 from a terminal ring 46 at the top of section 40 and insulated from the valve body. A contact terminal 47 extends laterally from ring 46.

In this construction both the valve inlet and the screw plug points are in the combustion chamber, but as in the other constructions they are so disposed that the auxiliary air does not strike the points.

It is obvious that still other modifications may be made of the constructions shown in the drawings and above particularly described within the scope of the invention as defined in the following claims.

What is claimed is:

1. For internal combustion engines having a cylinder with a head closing one end and a piston operable in the cylinder and a spark plug screwed into an opening in the head for igniting a combustible mixture under compression in the cylinder, means for introducing auxiliary air to the cylinder during a period immediately following the ignition comprising a valve body securable in the head of the cylinder and having a passage therethrough communicating with the interior of the cylinder when the valve body is in said head, a source of air under substantially constant pressure for the outer end of said passage, two opposing valve seats in said passage, and a double acting check valve disposed between the valve seats in the passage and adapted to make closing contacts with both valve seats and movable between them by a preponderance of pressure in the respective portion of the passage including the unoccupied seat.

2. Means for introducing auxiliary air into a cylinder of an internal combustion engine as defined in claim 1 in which there is a valve chamber between the valve seats of greater transverse dimension than that of the check valve.

3. Means for introducing auxiliary air into a cylinder of an internal combustion engine as defined in claim 2 in which the check valve is a ball.

4. Means for introducing auxiliary air into a cylinder of an internal combustion engine as defined in claim 2 in which the check valve is a cylindrical member having a pressure area on each end, the pressure areas being of different size.

5. Means for introducing auxiliary air into a cylinder of an internal combustion engine as defined in claim 2 together with a spring bearing against the check valve on the side toward one seat and urging the valve toward the other seat.

6. Means for introducing auxiliary air into a cylinder of an internal combustion engine as defined in claim 5 in which the spring bears against the valve on the side toward the outer end of the passage.

7. Means for introducing auxiliary air into a cylinder of an internal combustion engine as defined in claim 6 together with a relatively weaker spring bearing against the valve on the side toward the inner end of the passage and opposing the first mentioned spring.

8. For internal combustion engines having a cylinder with a head closing one end and a piston reciprocable in the cylinder, means for introducing auxiliary air to the cylinder during a period immediately following the ignition comprising a valve body having a passage therethrough from end to end, two opposing valve seats in said passage, a double acting check valve disposed and movable between the seats in the passage and adapted to make closing contact with both seats, and a spark plug surrounding and physically embracing the valve body in a composite unitary structure and having a screw threaded metallic end surrounding the inner end of the valve body and adapted to screw into an opening in the cylinder head.

References Cited in the file of this patent

UNITED STATES PATENTS

| | | |
|---|---|---|
| 1,392,364 | Smith | Oct. 4, 1921 |
| 1,645,170 | Whaley | Oct. 11, 1927 |
| 1,754,796 | McElroy | Apr. 15, 1930 |